(12) United States Patent
Nakayama et al.

(10) Patent No.: US 12,231,998 B2
(45) Date of Patent: Feb. 18, 2025

(54) COMMUNICATION SYSTEM, DATA TRANSMITTING DEVICE, COMMUNICATION DEVICE, AND COMMUNICATION METHOD

(71) Applicant: 3M INNOVATIVE PROPERTIES COMPANY, St. Paul, MN (US)

(72) Inventors: Tasuku Nakayama, Kanagawa (JP); Kengo Takasu, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 219 days.

(21) Appl. No.: 17/783,173

(22) PCT Filed: Dec. 9, 2020

(86) PCT No.: PCT/IB2020/061711
§ 371 (c)(1),
(2) Date: Jun. 7, 2022

(87) PCT Pub. No.: WO2021/116947
PCT Pub. Date: Jun. 17, 2021

(65) Prior Publication Data
US 2022/0417717 A1    Dec. 29, 2022

(30) Foreign Application Priority Data
Dec. 12, 2019    (JP) .................................. 2019-224594

(51) Int. Cl.
*H04W 4/42* (2018.01)
*B61L 3/12* (2006.01)
*H04L 67/12* (2022.01)

(52) U.S. Cl.
CPC .............. *H04W 4/42* (2018.02); *B61L 3/125* (2013.01); *H04L 67/12* (2013.01)

(58) Field of Classification Search
CPC .......... H04W 4/42; H04L 67/12; B61L 3/125
See application file for complete search history.

(56) References Cited

U.S. PATENT DOCUMENTS 6,788,951 B2    9/2004  Aoki et al.
10,762,791 B2 *  9/2020  Switkes ................ H04W 4/029
(Continued)

FOREIGN PATENT DOCUMENTS

AU              4041595 A      6/1996
DE    10 2015 005 237 A1     10/2016
(Continued)

OTHER PUBLICATIONS

International Search Report for PCT International Application No. PCT/IB2020/061711 mailed on Feb. 12, 2021, 5 pages.

*Primary Examiner* — Long T Tran
(74) *Attorney, Agent, or Firm* — Sriram Srinivasan (57) ABSTRACT

The invention seeks to provide a communication system, a data transmitting device, a communication device, and a communication method capable of exchanging a sufficient capacity of data in a simple configuration without reducing the speed of a vehicle. The invention provides a communication system for transmitting data by a data transmitting device provided on a route of a moving body to the moving body having a plurality of vehicles in one formation; each of the plurality of vehicles being provided with a receiving unit that receives data transmitted from the data transmitting device; and the data transmitting device being configured to transmit mutually different data to the receiving units of the plurality of vehicles. The moving body may be a train such as the Shinkansen, or a transport vehicle such as a truck to which a plurality of cargo vehicles are connected.

11 Claims, 10 Drawing Sheets

(56) References Cited

U.S. PATENT DOCUMENTS

| | | | |
|---|---|---|---|
| 2011/0164562 A1* | 7/2011 | Qiu | H04W 72/543 |
| | | | 370/328 |
| 2011/0270475 A1* | 11/2011 | Brand | B61L 15/0027 |
| | | | 701/19 |
| 2014/0181246 A1 | 6/2014 | Richardson et al. | |
| 2014/0207316 A1* | 7/2014 | Kolambekar | B61L 15/0027 |
| | | | 701/19 |
| 2015/0217790 A1* | 8/2015 | Golden | B60T 17/228 |
| | | | 701/19 |
| 2016/0078695 A1* | 3/2016 | McClintic | G07C 5/0816 |
| | | | 701/29.4 |
| 2016/0144875 A1* | 5/2016 | Kim | B61L 25/021 |
| | | | 370/328 |
| 2016/0359741 A1* | 12/2016 | Cooper | H04W 4/44 |
| 2017/0129512 A1* | 5/2017 | Shubs, Jr. | G07C 5/008 |
| 2017/0287233 A1* | 10/2017 | Nix | G08G 1/166 |
| 2017/0369055 A1* | 12/2017 | Saigusa | G08G 1/096775 |
| 2020/0008027 A1 | 1/2020 | Yabuuchi et al. | |

FOREIGN PATENT DOCUMENTS

| | | | |
|---|---|---|---|
| JP | 07087011 A | 3/1995 | |
| JP | 2003152627 A | 5/2003 | |
| JP | 2005328500 A | 11/2005 | |
| JP | 4050565 B2 | 2/2008 | |
| JP | 2008160204 A | 7/2008 | |
| JP | 4419274 B2 | 2/2010 | |
| JP | 4692021 B2 | 6/2011 | |
| JP | 2018-097668 A | 6/2018 | |
| JP | 2019004418 A | 1/2019 | |

* cited by examiner

| Data Packet | Ack/ No Ack |
|---|---|
| #1 | Ack |
| #2 | Ack |
| #3 | Ack |
| #X | No Ack |
| #n-3 | Ack |
| #n-2 | Ack |
| #n-1 | No Ack |
| #n | No Ack |

COMMUNICATION SYSTEM, DATA TRANSMITTING DEVICE, COMMUNICATION DEVICE, AND COMMUNICATION METHOD

CROSS REFERENCE TO RELATED APPLICATIONS

This application is a national stage filing under 35 U.S.C. § 371 of International Application No. PCT/IB2020/061711, filed on 9 Dec. 2020, which claims the benefit of JP Application No. 2019-224594, filed on 12 Dec. 2019, the entire disclosure of each of which is incorporated by reference herein.

TECHNICAL FIELD

One aspect of the invention relates to a communication system, a data transmitting device, a communication device, and a communication method.

BACKGROUND

As a communication system in the related art, a communication system as described in Patent Document 1 is known. In this communication system, a vehicle is provided with a receiving device in order to receive data from an underground data transmitting device on a route on which a moving body passes. The receiving device of the vehicle receives data from the data transmitting device by traveling on the route above the data transmitting device.

SUMMARY

Technical Problem

In the communication system as described above, a special inspection must be performed by using an inspection vehicle in order to grasp the condition of the route. Furthermore, it is necessary for the vehicle to move in a speed-limited state in order to receive data from the data transmitting device without omission. In this respect, in a case where other vehicles also pass along the route, it is necessary to consider a situation of passing these vehicles. In addition, in a case where a worker tries to check the condition of the route, there is a problem in that the distance is too long and it takes a lot of time and effort. Moreover, in a case where the performance of the receiving device mounted on the vehicle is improved and the receiving speed is increased, there is a problem that the cost increases.

It is an object of the present invention to provide a communication system, a data transmitting device, a communication device, and a communication method capable of exchanging a sufficient amount of data with a simple configuration and without reducing the speed of a vehicle.

Solution to Problem

A communication system according to the present embodiment is a communication system for transmitting data by a data transmitting device provided on a route of a moving body to the moving body having a plurality of vehicles in one formation, wherein each of the plurality of vehicles is provided with a receiving unit that receives the data transmitted from the data transmitting device, and the data transmitting device is configured to transmit mutually different data to each of the receiving units of the plurality of vehicles.

A data transmitting device according to the present embodiment is a data transmitting device that is provided on a route of a moving body and that transmits data to the moving body having a plurality of vehicles in one formation, wherein the data transmitting device is configured to transmit mutually different data to the plurality of receiving units provided in the plurality of vehicles of the moving body, respectively.

A communication device according to the present embodiment is a communication device that is provided in a moving body having a plurality of vehicles in one formation and that receives data from a data transmitting device provided on a route of the moving body, wherein the communication device includes: a plurality of receiving units that are provided in a plurality of vehicles and that are configured to receive mutually different data; and a data synthesizing unit that is configured to synthesize the mutually different data received by each of the receiving units.

A communication method according to an aspect of the present invention is a communication method for transmitting data by a data transmitting device provided on a route of a moving body to the moving body having a plurality of vehicles in one formation, wherein the communication method includes: a receiving step for receiving information from the moving body provided with a receiving unit configured to receive the data transmitted from the data transmitting device; and a transmitting step of transmitting mutually different data to each of the receiving units of the plurality of vehicles based on the information.

Advantageous Effects of Invention

According to one aspect of the present invention, there is provided a communication system, a data transmitting device, a communication device, and a communication method capable of exchanging a sufficient amount of data with a simple configuration without reducing the speed of a moving body.

DESCRIPTION OF EMBODIMENTS

Detailed descriptions of the embodiments according to the present invention are given below with reference to the attached drawings. In the description of the drawings, identical or equivalent elements are denoted by the same reference signs, and redundant description of such elements will be omitted.

Figure 1:
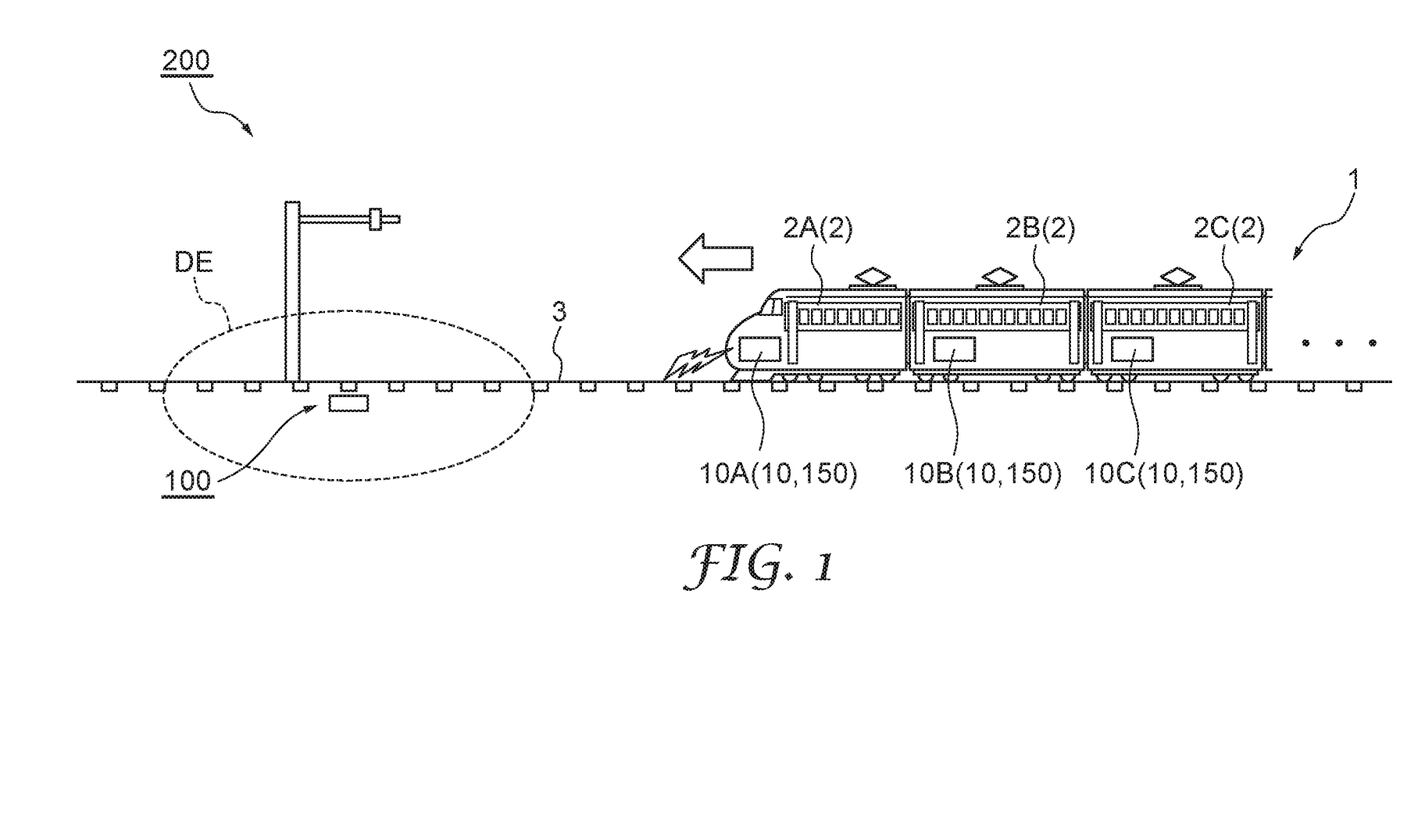
FIG. 1 is a schematic configuration diagram illustrating a data transmitting device, a communication device, and a communication system according to an embodiment of the present invention.

FIG. 1 is a schematic configuration diagram illustrating a data transmitting device 100, a communication device 150, and a communication system 200 according to the embodiment of the present invention. The communication system 200 is a system that transmits data by the data transmitting device 100 provided on the route 3 of the moving body 1 to the moving body 1 having a plurality of vehicles 2 in one formation. In addition, the data transmitting device 100 is a device that is provided on the route 3 of the moving body 1 having the plurality of vehicles 2 in one formation and that transmits data to the moving body 1. The communication device 150 is a device that is provided in the moving body 1 having the plurality of vehicles 2 in one formation and that receives data from the data transmitting device 100 that is provided on the route 3 of the moving body 1.

In the present embodiment, a train such as the Shinkansen is exemplified as the moving body 1. A train of one formation is configured by sequentially connecting the plurality of vehicles 2 to the vehicle 2 (leading vehicle) provided with a driver's seat. In this case, the rail on which the train runs is the route 3.

The communication device 150 has a plurality of receiving units 10. Each of the plurality of vehicles 2 is provided with the receiving unit 10 that receives data transmitted from the data transmitting device 100. Note that in the present embodiment, in order to simplify the description, it is assumed that three receiving units 10 are provided in order from the lead vehicle 2. In the following description, the lead vehicle 2 may be referred to as a "vehicle 2A", and the receiving unit 10 provided in the vehicle 2A may be referred to as a "receiving unit 10A". Furthermore, the second vehicle 2 from the lead may be referred to as a "vehicle 2B", and the receiving unit 10 provided in the vehicle 2B may be referred to as a "receiving unit 10B". In addition, the third vehicle 2 from the lead may be referred to as a "vehicle 2C", and the receiving unit 10 provided in the vehicle 2C may be referred to as a "receiving unit 10C".

Note that the moving body 1 is not limited to a train as long as the moving body 1 includes the plurality of vehicles 2, and for example, the moving body 1 may be a transport vehicle such as a truck to which a plurality of cargo vehicles are connected to the lead vehicle. In this case, the road on which the transport vehicle travels is the route 3.

The data transmitting device 100 is provided at a specified position on the route 3. Here, the data transmitting device 100 is provided in the underground below the rail. Note that the position on the route 3 where the data transmitting device 100 is provided is not particularly limited and may be attached to a structure such as a pillar or the like near the rail. A communication area DE is an area where communication is possible and is set in the data transmitting device 100. The data transmitting device 100 may transmit data to the receiving unit 10 that has entered into the communication area DE together with the moving body 1. In the present embodiment, as the moving body 1 moves, the receiving unit 10A, the receiving unit 10B, and the receiving unit 10C enter the communication area DE in this order, and then the receiving unit 10A, the receiving unit 10B, and the receiving unit 10C exit from the communication area DE in that order. Therefore, the data transmitting device 100 transmits data in order of the receiving unit 10A, the receiving unit 10B, and the receiving unit 10C.

Figure 2:
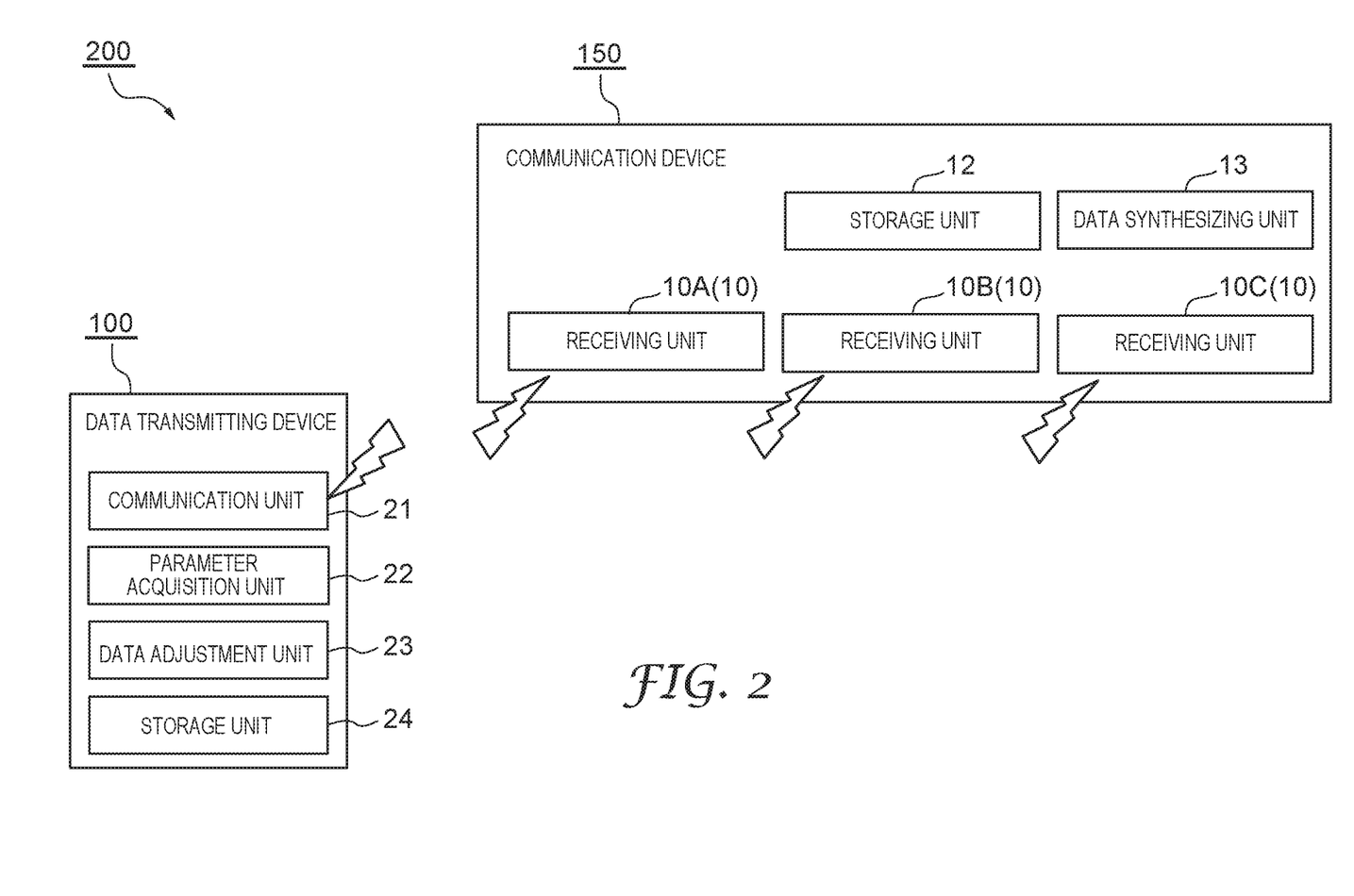
FIG. 2 is a block configuration diagram illustrating a block configuration of a communication system.

Next, a block configuration of the communication system 200 will be described with reference to FIG. 2. FIG. 2 is a block configuration diagram illustrating a block configuration of the communication system 200. As illustrated in FIG. 2, the communication system 200 includes the above-described data transmitting device 100 and the above-described communication device 150.

The data transmitting device 100 is a device that transmits mutually different data to each of the receiving units 10 of the plurality of vehicles 2. The data transmitting device 100 includes a communication unit 21, a parameter acquisition unit 22, a data adjustment unit 23, and a storage unit 24.

The communication unit 21, by performing communication with the communication device 150, together with transmitting information to the communication device 150, receives information from the communication device 150. The communication unit 21 transmits data in the transmission mode set by the data adjustment unit 23.

The parameter acquisition unit 22 acquires information on parameters that affect data transmission. The parameter acquisition unit 22 acquires the parameter information from the information of the communication device 150 received by the communication unit 21. More specifically, the parameter acquisition unit 22 acquires, as parameters, the number of vehicles provided with the receiving units 10 of the moving body 1, the distance between the receiving units 10 of the moving body 1, and the speed of the moving body 1. Moreover, the parameter acquisition unit 22, by reading the data stored in the storage unit 24, acquires the total amount of all data to be transmitted as parameters.

Figure 3:
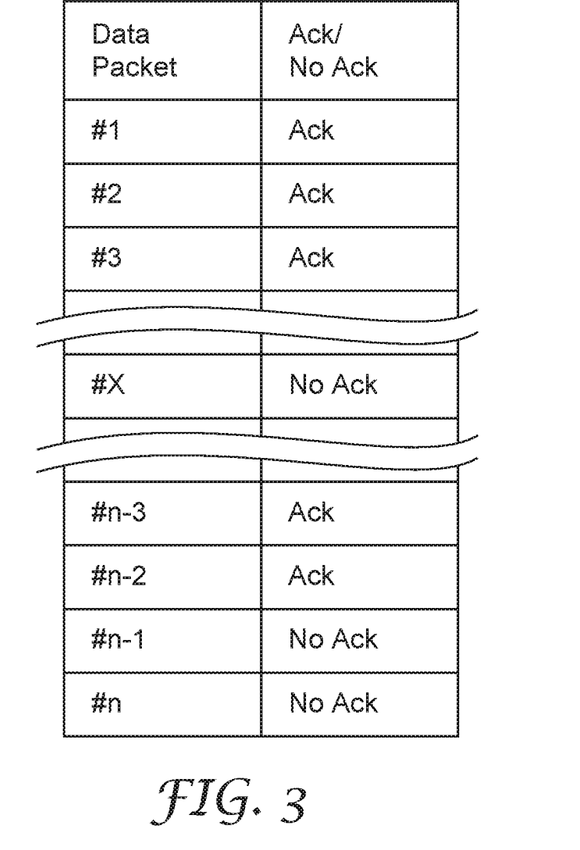
FIG. 3 is a table illustrating a data transmission status by a data transmitting device.

The data adjustment unit 23 adjusts the data transmission mode to the respective receiving units 10 of the plurality of vehicles 2. Here, even though the data transmitting device 100 transmits a plurality of data to one receiving unit 10, it does not mean that data transmission for all data will succeed, and data transmission for some data fails. Accordingly, the data transmitting device 100 retransmits the data for which data transmission has failed. For example, as illustrated in the table of FIG. 3, it is presumed that a total of n pieces of data from "data 1" to "data n" have been transmitted. On the other hand, "Ack" indicates data that has been successfully transmitted, and "No Ack" indicates data that has failed to be transmitted. Therefore, the data transmitting device 100 later retransmits the data (for example, the data X, the data n–1, the data n) corresponding to "No Ack". Moreover, even in a case where the plurality of data that have failed to be transmitted are retransmitted, the transmission of all the data items is not guaranteed to succeed, so it is necessary to further re-retransmit the data that have failed to be retransmitted. By repeating the retransmission in this way, the number of data for retransmission is gradually reduced, and finally the transmission of all data is completed.

On the other hand, the data adjustment unit 23 adjusts the timing at which the data is to be retransmitted. The data adjustment unit 23 may retransmit the data to another receiving unit 10 different from the one that has failed in the transmission. In this case, the communication unit 21 transmits the specified data to the receiving unit 10 of the one vehicle 2 and then transmits the data corresponding to the retransmission portion of the specified data to the receiving unit 10 of another vehicle 2.

Figure 4:
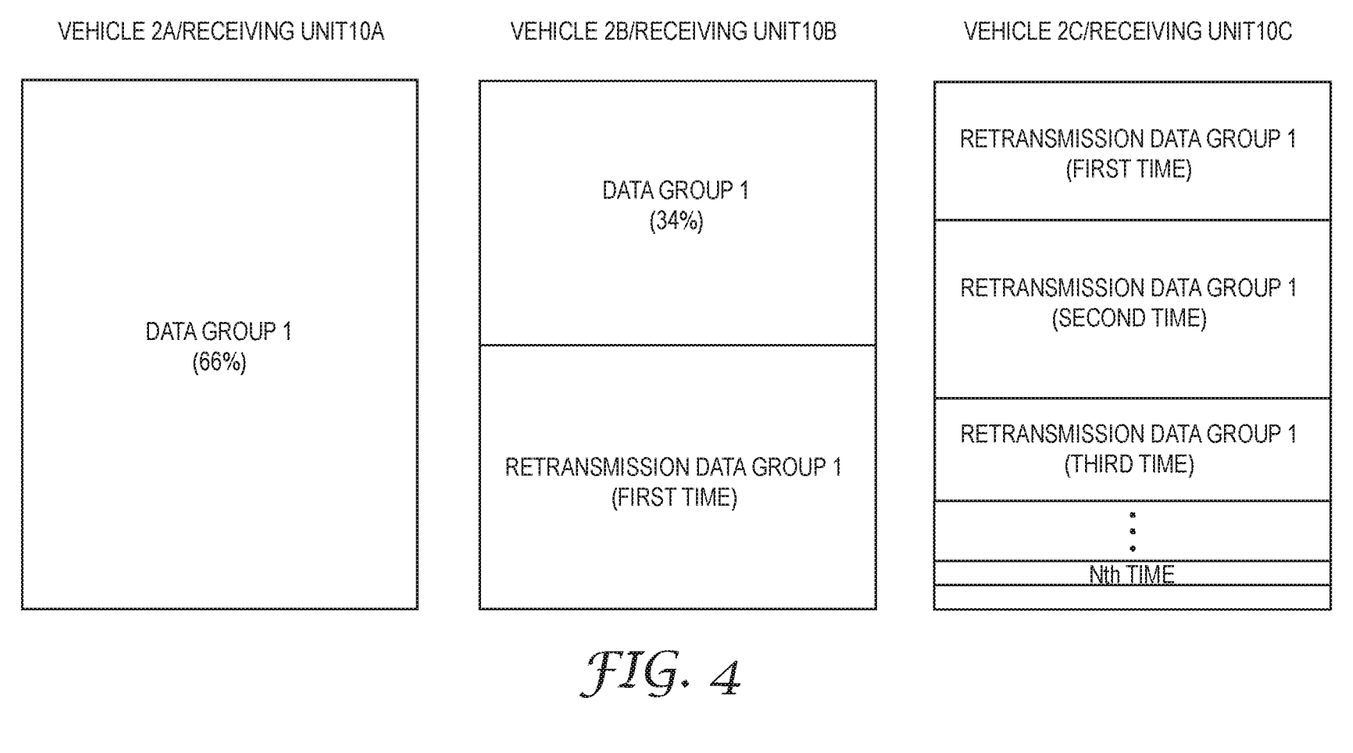
FIG. 4 is a schematic diagram illustrating how the data transmitting device transmits data to the receiving unit of each vehicle.

A data transmission mode adjusted by the data adjustment unit 23 will be described with reference to FIG. 4. FIG. 4 is a schematic diagram illustrating how the data transmitting device 100 transmits data to the receiving units 10A, 10B, and 10C of the vehicles 2A, 2B, and 2C. The bar graph corresponding to "vehicle 2A and receiving unit 10A" indicates the content of data transmitted to receiving unit 10A of vehicle 2A. Note that in the bar graph, time progresses from top to bottom. It should be noted that in this description, a set of a plurality of data is referred to as a "data group".

In the example illustrated in FIG. 4, the data adjustment unit 23 does not divide all the data but sequentially transmits the data according to the numbers corresponding to the respective data, and then after the first transmission of all the data is completed, the data for which transmission has failed is set for retransmission. Note that here, the data is not divided into a plurality of groups, and therefore all data is described as belonging to a "data group 1". In addition, a set of data that has failed to be transmitted in the data of the data group 1 is referred to as a "retransmission data group 1".

With such a setting, the data transmitting device 100 sequentially transmits the data of the data group 1 to the receiving unit 10A. Here, the receivable data capacity of the receiving unit 10A is less than the total capacity of the data group 1. Therefore, the data transmitting device 100 transmits the transmittable number of data (here, 66% of the total data) to the receiving unit 10A of the vehicle 2A. Next, the data transmitting device 100 transmits the remaining data (34% of the total data) to the receiving unit 10B of the vehicle 2B. Here, the receiving unit 10B of the vehicle 2B has a surplus of receivable data capacity. Accordingly, the data transmitting device 100 performs the first retransmission for the retransmission data group 1. Note that the remaining data capacity of the receiving unit 10B of the vehicle 2B is smaller than the data capacity of the first retransmission data group 1. Therefore, the data transmitting device 100 transmits the data of the remaining first retransmission data group 1 to the receiving unit 10C of the vehicle 2C. The data transmitting device 100 retransmits the retransmission data group 1 with a plurality of data that has failed in the first retransmission to the receiving unit 10C of the vehicle 2C for the second time. The data transmitting device 100 completes the transmission of all data by repeating the retransmission of the retransmission group 1 a plurality of times (n times). Note that in the following description, in a case where the term "retransmit a retransmission group" is used, it means that all data transmission is completed by repeating retransmission a plurality of times, unless particularly specified otherwise.

Moreover, the data adjustment unit 23 may divide all data to be transmitted into a plurality of data groups and set each data group to be transmitted to mutually different receiving units 10. In this case, the communication unit 21 transmits the divided plurality of data groups to the receiving units 10 of mutually different vehicles 2. The data adjustment unit 23 may be set to retransmit the data to the same receiving unit 10 in which transmission has failed.

Figure 5:
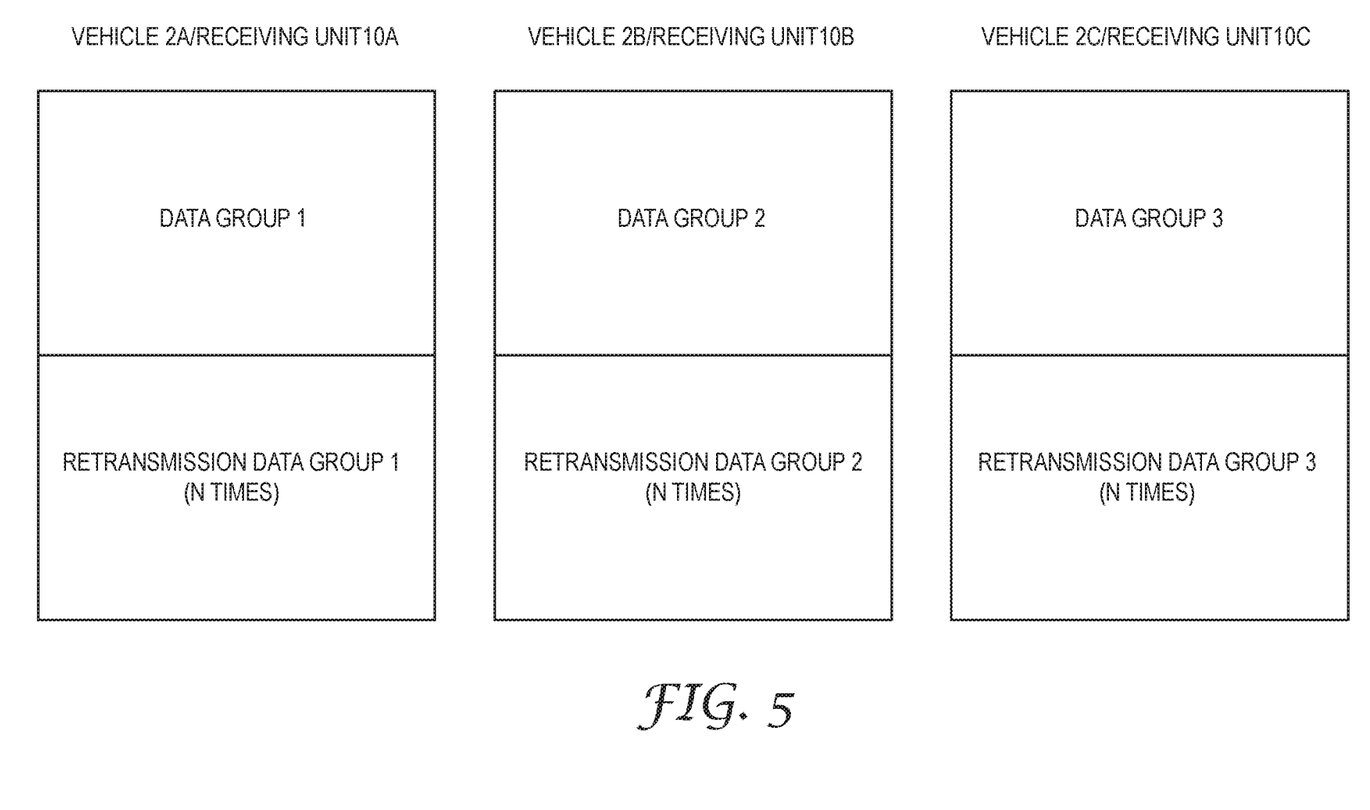
FIG. 5 is a schematic diagram illustrating another example of a data transmission mode adjusted by a data adjustment unit.

Another example of the data transmission mode adjusted by the data adjustment unit 23 will be described with reference to FIG. 5. In the example illustrated in FIG. 5, the data adjustment unit 23 divides all the data to be transmitted into three data groups 1, 2, and 3 according to the number of receiving units 10A, 10B, and 10C. In addition, although the data adjustment unit 23 transmits the data groups 1, 2, and 3, the data adjustment unit 23 allows the excess capacity of the receiving units 10A, 10B, and 10C to remain and retransmits the retransmission data groups 1, 2, and 3 with respect to the remaining capacity.

With such a setting, the data transmitting device 100 transmits the data of the data group 1 to the receiving unit 10A. Then, the data transmitting device 100 retransmits the retransmission data group 1 to the receiving unit 10A. Next, the data transmitting device 100 transmits the data of the data group 2 to the receiving unit 10B. Then, the data transmitting device 100 retransmits the retransmission data group 2 to the receiving unit 10B. Next, the data transmitting device 100 transmits data of the data group 3 to the receiving unit 10C. Then, the data transmitting device 100 retransmits the retransmission data group 3 to the receiving unit 10C.

In a case where all the data to be transmitted cannot be transmitted with the capacity of all the receiving units 10 included in the moving body 1 in one formation, the data adjustment unit 23 may divide all the data into a plurality of data groups and may transmit the respective data groups to the receiving units 10 of the moving body 1 in a plurality of formations. Note that the data adjustment unit 23 may be set to retransmit the data to the receiving units 10 of the same formation as the one in which transmission has failed.

Figure 6:
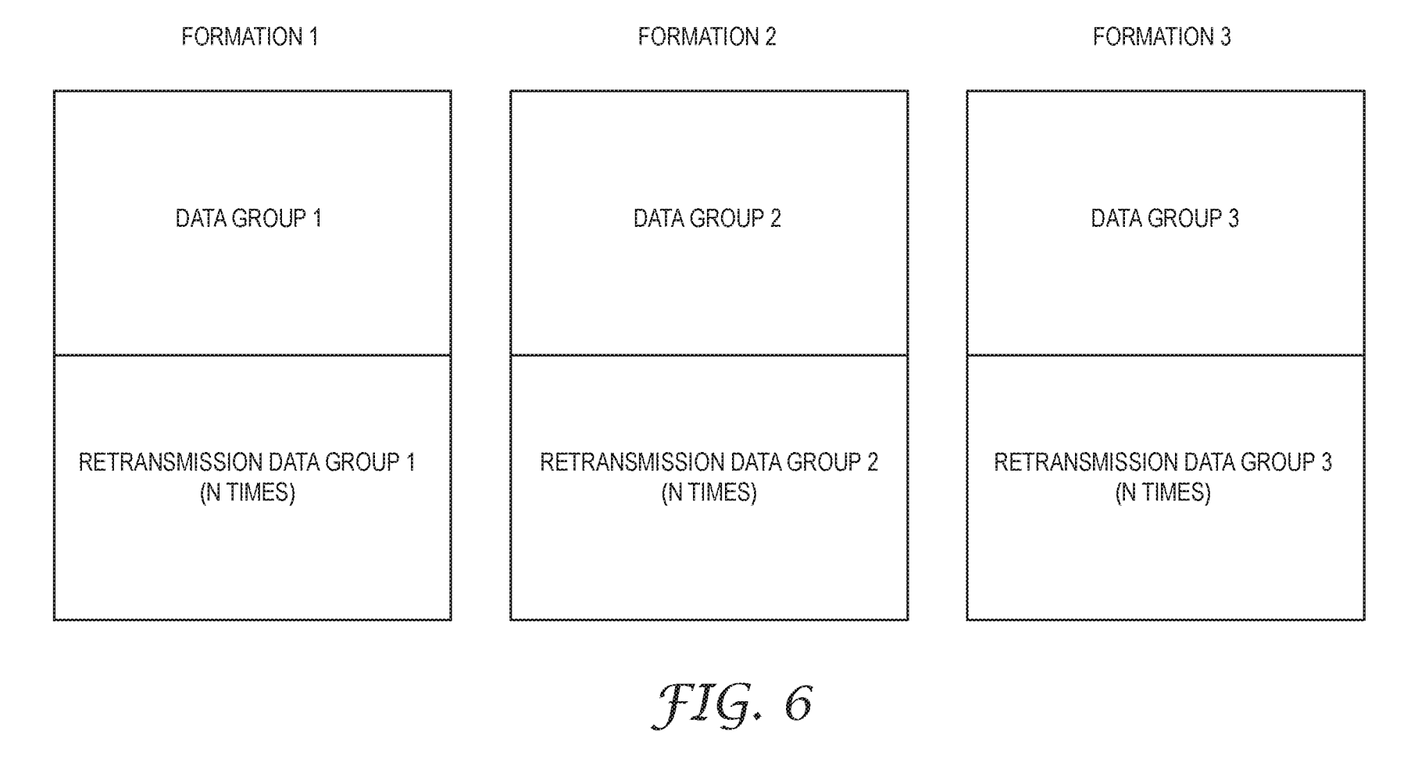
FIG. 6 is a schematic diagram illustrating another example of a data transmission mode adjusted by a data adjustment unit.

Another example of the data transmission mode adjusted by the data adjustment unit 23 will be described with reference to FIG. 6. In the example illustrated in FIG. 6, the data adjustment unit 23 divides all the data to be transmitted into three data groups 1, 2, and 3, according to the capacity of all the data to be transmitted and the total data capacity of all the receiving units 10 of the moving body 1 per one formation. In addition, although the data adjustment unit 23 transmits the data groups 1, 2, and 3, the data adjustment unit 23 allows the data capacity of formations 1, 2, and 3 to remain and retransmits the retransmission data groups 1, 2, and 3 with respect to the remaining capacity. Note that the data transmission modes to the plurality of receiving units 10 of each formation 1, 2, and 3 are the same as those illustrated in FIGS. 4 and 5.

The data adjustment unit 23 adjusts the data transmission mode to each of the receiving units 10 of the plurality of vehicles 2, according to the number of vehicles acquired by the parameter acquisition unit 22. In the present embodiment, the moving body 1 has three receiving units 10A, 10B, and 10C. Accordingly, the data adjustment unit 23 adjusts how the data is distributed to the three receiving units 10A, 10B, and 10C. The data adjustment unit 23 adjusts the data transmission mode to each of the receiving units 10 of the plurality of vehicles 2, according to the distance between the receiving units 10 acquired by the parameter acquisition unit 22. In other words, the longer the distance between the receiving units 10, the longer the time from when the receiving unit 10 enters the communication area DE until the next receiving unit 10 enters the communication area DE. The data adjustment unit 23 adjusts the data transmission mode to each of the receiving units 10 of the plurality of vehicles 2, according to the speed of the moving body 1 acquired by the parameter acquisition unit 22. The faster the speed of the moving body 1, the longer the time that each receiving unit 10 stays in the communication area DE. The data adjustment unit 23 adjusts the data transmission mode to each of the receiving units 10 of the plurality of vehicles 2, according to the total amount of all data to be transmitted.

The storage unit 24 is a unit that stores various types of information. The storage unit 24 stores data to be transmitted by the data transmitting device 100. The data to be transmitted has information on at least one item of: temperature, current, voltage, vibration, and partial discharge of the cable provided on the route 3. These pieces of information are updated in a specified period (for example, every day). Note that the route 3 is provided with a sensor (not illustrated) for detecting the information of the above items. The sensor transmits the acquired detection results to the storage unit 24. As a result, the storage unit 24 stores the latest information.

Next, a block configuration of the communication device 150 will be described. The communication device 150 includes the receiving unit 10, a parameter transmitting unit 11, a storage unit 12, and a data synthesizing unit 13 described above. Note that the storage unit 12 and the data synthesizing unit 13 may be provided in any one of the plurality of vehicles 2 included in the moving body 1 and may be provided in the lead vehicle 2, for example.

The storage unit 12 stores parameters related to the moving body 1 for transmission to the data transmitting device 100. The receiving units 10A, 10B, and 10C has a function of transmitting the parameter stored in the storage unit 12 to the data transmitting device 100. The parameters transmitted by the parameter transmitting unit 11 are parameters among the parameters acquired by the parameter acquisition unit 22 described above that are related to the moving body 1.

The data synthesizing unit 13 synthesizes mutually different data received by the respective receiving units 10. For example, in the example illustrated in FIG. 4, the data synthesizing unit 13 synthesizes the data group 1 (data that has been successfully transmitted) received by the receiving unit 10A, the data group 1 (data that has been successfully transmitted) received by the receiving unit 10B, retransmission data group 1 received by the receiving unit 10B, and retransmission data group 1 received by the receiving unit 10C. In the example illustrated in FIG. 5, the data synthesizing unit 13 synthesizing the data groups 1, 2, and 3 (data that has been successfully transmitted) received by the receiving units 10A, 10B, and 10C and the retransmission data groups 1, 2, and 3 received by the receiving units 10A, 10B, and 10C. Note that, in the case of the example illustrated in FIG. 6, the data synthesizing unit 13 of any of the formations 1, 2, and 3 synthesizes the data groups 1, 2, and 3 and the retransmission data groups 1, 2, and 3 acquired by the formations 1, 2, and 3.

Figure 7:
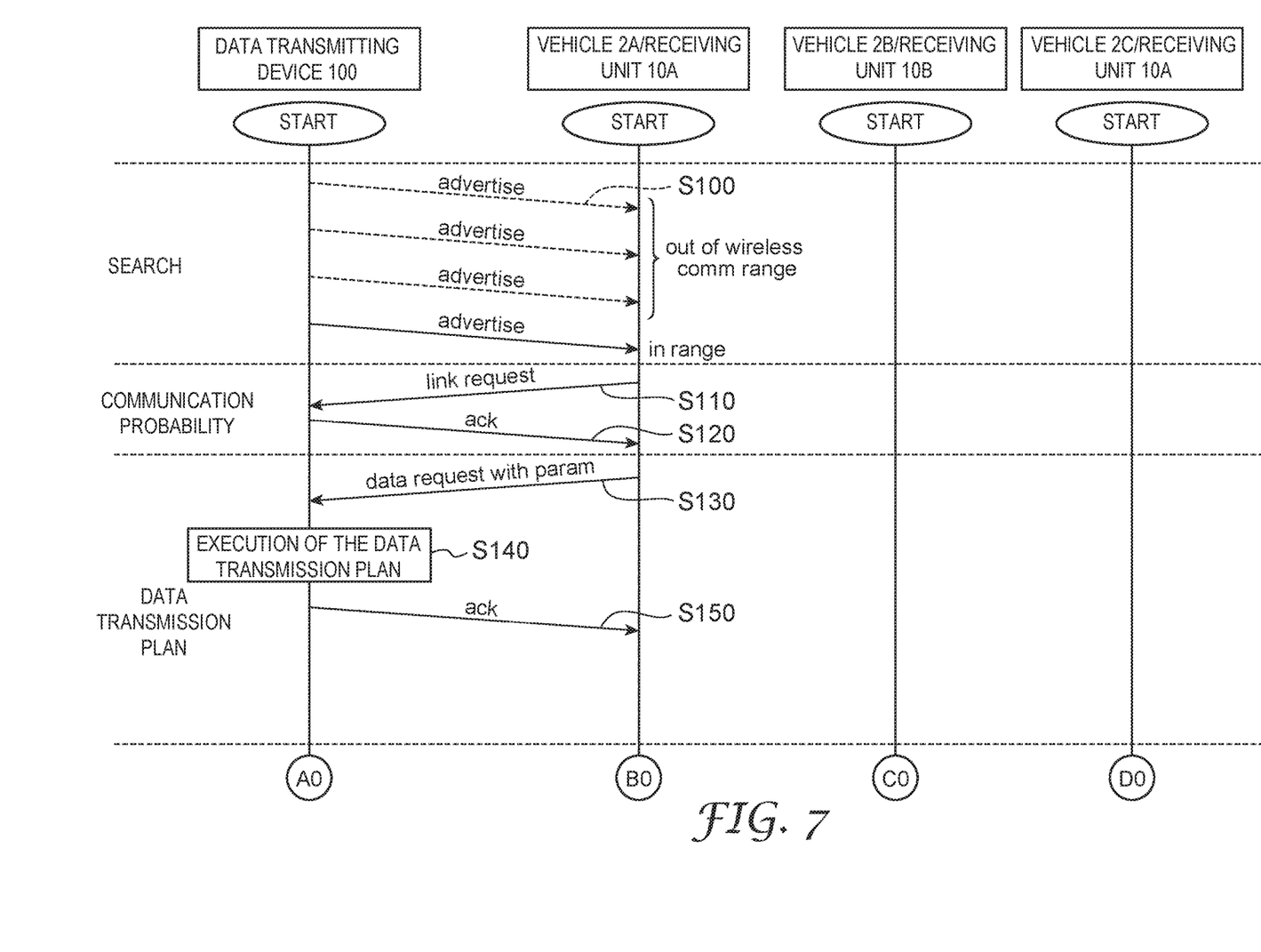
FIG. 7 is a flowchart illustrating a communication method according to an embodiment of the present invention.
Figure 8:
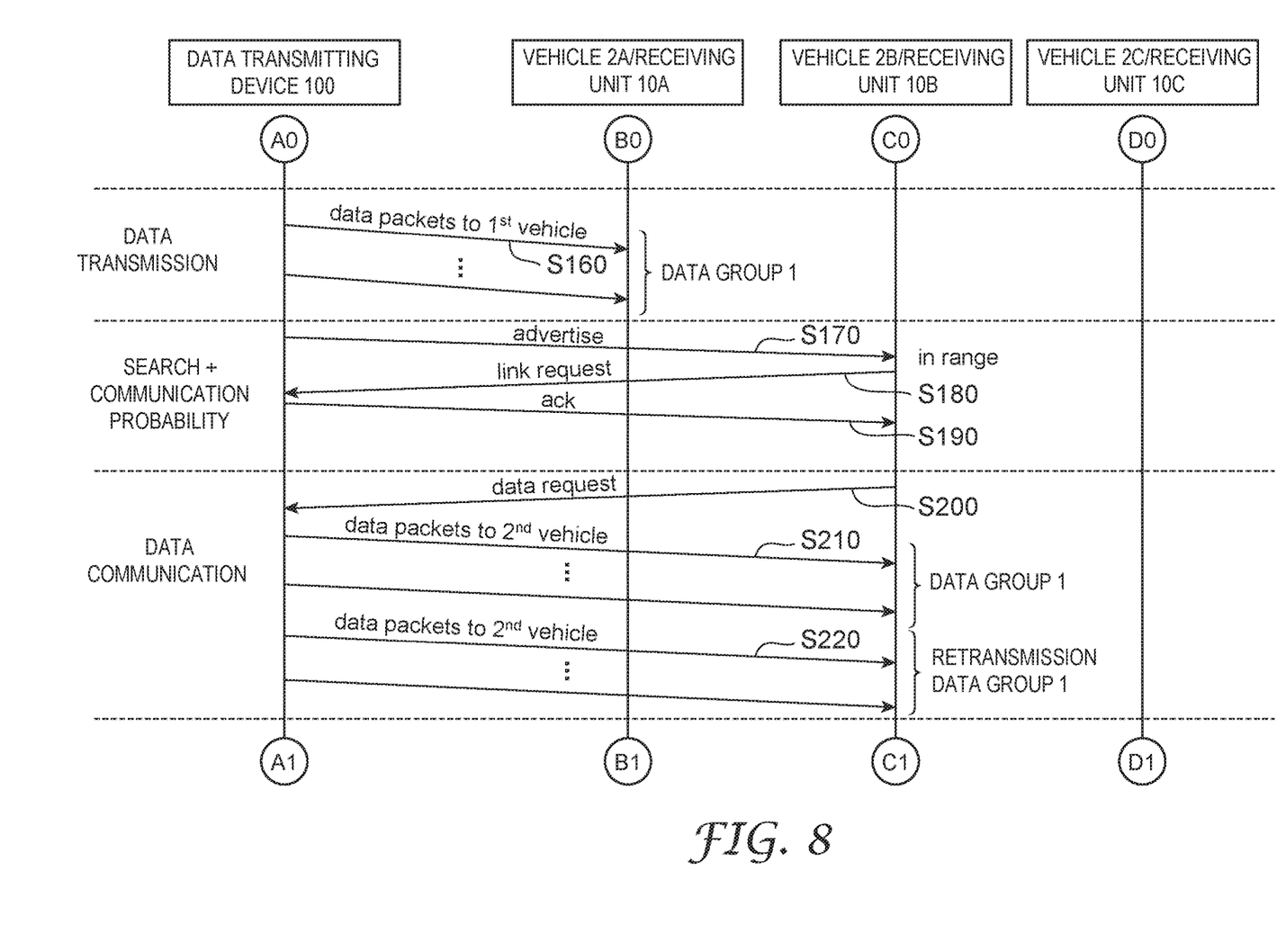
FIG. 8 is a flowchart illustrating a communication method according to an embodiment of the present invention.
Figure 9:
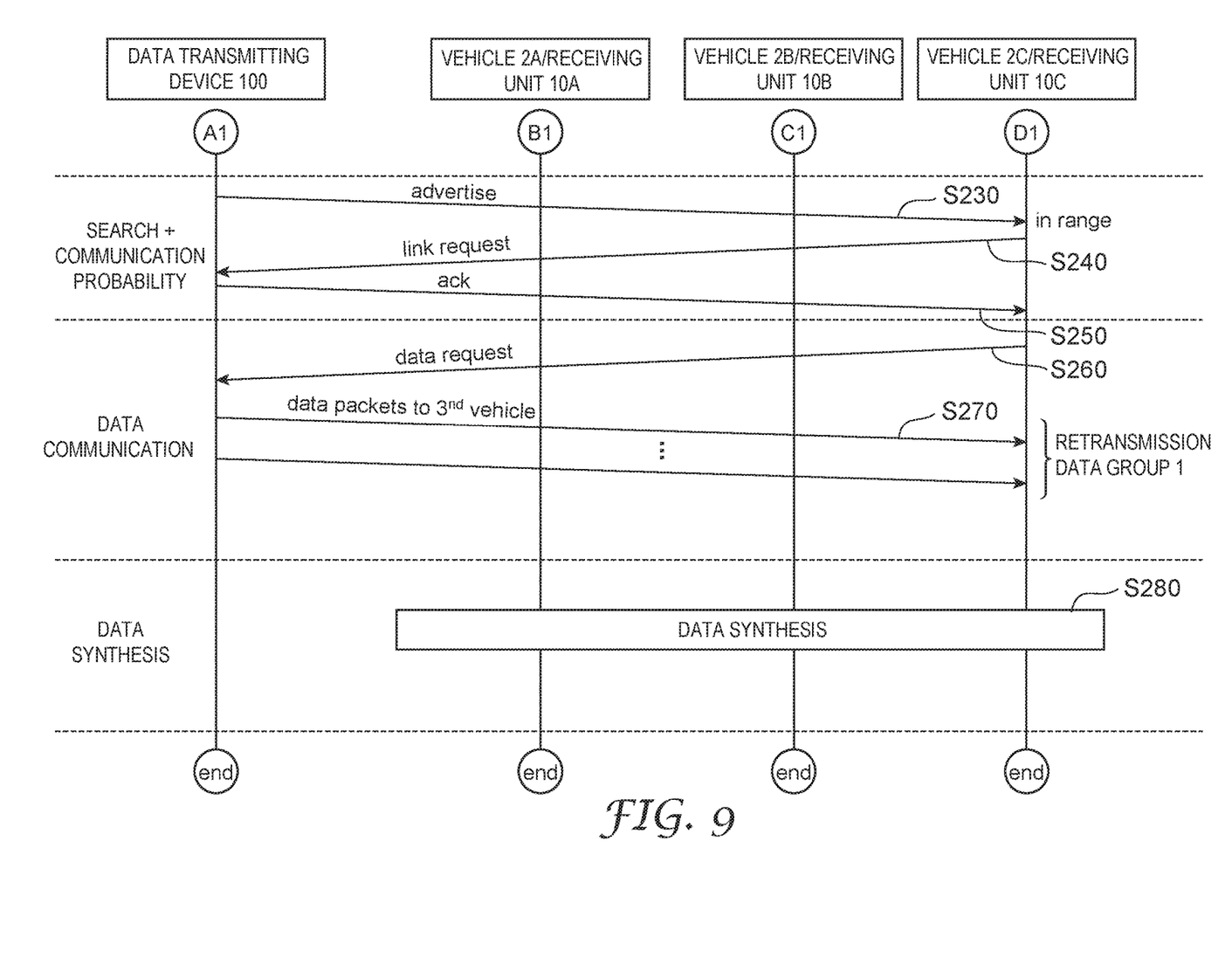
FIG. 9 is a flowchart illustrating a communication method according to an embodiment of the present invention.

Next, a communication method according to embodiments of the present invention will be described with reference to FIGS. 7 to 9. FIGS. 7 to 9 are flowcharts illustrating a communication method according to embodiments of the present invention. Here, an example of a flowchart in a case where the data transmitting device 100 transmits data to the receiving unit 10A of the vehicle 2A, the receiving unit 10B of the vehicle 2B, and the receiving unit 10C of the vehicle 2C in the transmission mode illustrated in FIG. 4 is described. This communication method is a method in which the data transmitting device 100 provided on the route of the moving body 1 transmits data to the receiving units 10A, 10B, and 10C of the moving body 1 having the plurality of vehicles 2A, 2B, and 2C in one formation.

As illustrated in FIG. 7, first, the data transmitting device 100 searches for a data transmission destination. The data transmitting device 100 transmits a signal declaring the establishment of communication to the surroundings at a regular time interval (step S100). In a case where the receiving unit 10A does not reach the range of the communication area DE, the signal is not received (arrow indicated by a broken line), but when the receiving unit 10A reaches the range of the communication area DE, the signal is received by the receiving unit 10A (arrow indicated by a solid line). Accordingly, the data transmitting device 100 knows that the receiving unit 10A exists within the communication area DE. Next, the data transmitting device 100 establishes communication with the receiving unit 10A. Here, the data transmitting device 100 receives a connection request signal from the receiving unit 10A (step S110) and transmits a response signal to the receiving unit 10A indicating that the connection has been executed (step S120). As a result, the communication between the data transmitting device 100 and the receiving unit 10A is established.

Next, the data transmitting device 100 makes a data transmission plan. Here, the data transmitting device 100 executes a receiving step for receiving information from the moving body 1 in which receiving units 10A, 10B, and 10C for receiving data transmitted from the data transmitting device 100 are provided in the plurality of vehicles 2A, 2B, and 2C. More specifically, the data transmitting device 100 receives a data request signal together with the parameter information from the receiving unit 10A (step S130). Accordingly, the data transmitting device 100 executes the data transmission plan (step S140). In step S140, the data adjustment unit 23 of the data transmitting device 100 adjusts the data transmission mode as described in FIG. 4, based on the received parameters and the data capacity to be transmitted. As a result, the data transmitting device 100 makes a plan of how to transmit the data. After that, the data transmitting device 100 transmits a signal to the receiving unit 10A indicating that the data transmission plan is completed (step S150).

Next, the data transmitting device 100 performs data transmission for a part of the data group 1 to the receiving unit 10A. The data transmitting device 100 repeatedly transmits data to the receiving unit 10A (step S160) a set number of times. Accordingly, data transmission to the receiving unit 10A of the data transmitting device 100 is completed.

Next, the data transmitting device 100 searches for the receiving unit 10B and establishes communication. Similar to step S100, the data transmitting device 100 transmits a signal to the surroundings at a regular time interval declaring the establishment of communication (step S170) and recognizes the existence of the receiving unit 10B existing within the communication area DE. Next, the data transmitting device 100 receives a connection request signal from the receiving unit 10B (step S180) and transmits a response signal to the receiving unit 10B indicating that the connection has been executed (step S190). As a result, the communication between the data transmitting device 100 and the receiving unit 10B is established.

Next, the data transmitting device 100 transmits data to the receiving unit 10B. The data transmitting device 100 receives a data request signal from the receiving unit 10B (step S200). The data transmitting device 100 transmits the data of the remaining portion of the data group 1 to the receiving unit 10B (step S210) and retransmits the retransmission data group 1 (step S220). This completes the data transmission by the data transmitting device 100 to the receiving unit 10B.

Next, the data transmitting device 100 searches for the receiving unit 10C and establishes communication. Similar to step S100, the data transmitting device 100 transmits a signal to the surroundings at a regular time interval declaring the establishment of communication (step S230) and recognizes the existence of the receiving unit 10C existing within the communication area DE. Next, the data transmitting device 100 receives a connection request signal from the receiving unit 10C (step S240) and transmits a response signal to the receiving unit 10C indicating that the connection has been executed (step S250). As a result, the communication between the data transmitting device 100 and the receiving unit 10C is established.

Next, the data transmitting device 100 transmits data to the receiving unit 10C. The data transmitting device 100 receives a data request signal from the receiving unit 10C (step S260). The data transmitting device 100 retransmits the remaining portion of the retransmission data group 1 to the receiving unit 10C (step S270). This completes the data transmission by the data transmitting device 100 to the receiving unit 10C. As described above, in steps S160, S210, S220, and S270, steps for transmitting mutually different data to the receiving units 10A, 10B, and 10C of the plurality of vehicles 2A, 2B, and 2C based on the information are executed.

Next, a data synthesizing step of synthesizing the mutually different data received by the communication device 150 by the mutually different receiving units 10A, 10B, and 10C is executed (step S280). Here, the data synthesizing unit 13 synthesizes the data received by the receiving units 10A, 10B, and 10C in steps S160, S210, S220, and S270. This ends the flowchart illustrated in FIGS. 7 to 9.

Next, the operation and effects of the communication system 200 according to the present embodiment will be described.

The communication system 200 according to the present embodiment is the communication system 200 for transmitting data by the data transmitting device 100 provided on the route 3 of the moving body 1 to the moving body 1 having the plurality of vehicles 2 in one formation, wherein each of the plurality of vehicles 2 is provided with the receiving unit 10 that receives the data transmitted from the data transmitting device 100, and the data transmitting device 100 transmits mutually different data to each of the receiving units 10 of the plurality of vehicles 2.

In this communication system 200, each of the plurality of vehicles 2 is provided with the receiving unit 10 that receives the data transmitted from the data transmitting device 100. Then, the data transmitting device 100 transmits mutually different data to each of the receiving units 10 of the plurality of vehicles 2. In this case, even though the data transmitting device 100 is in a state where the speed of the vehicle is high and is unable to send all the data to one receiving unit 10, it is preferable that the data transmitting device 100, as a result, transmits all the data by the combination the data transmitted to the plurality of receiving units 10. As described above, a moving body does not need to perform low-speed operation or the like for special inspection and may acquire data even during normal operation. Moreover, it is not necessary to use an expensive receiving unit having a large capacity as the receiving unit 10 provided in the vehicle. As described above, it is possible to exchange a sufficient amount of data with a simple configuration without reducing the speed of the moving body 1.

The data transmitting device 100 may transmit specified data to the receiving unit 10 of one vehicle 2 and then transmit the data corresponding to the retransmission portion of the specified data to the receiving unit 10 of another vehicle 2, and in such case, even though there is data that has failed to be transmitted to one receiving unit 10, another receiving unit 10 may receive the retransmission portion of the data. For example, in a case where one receiving unit 10 must receive all the data even though transmission failure occurs, it becomes necessary to improve the performance of the receiving unit 10, to cope with increases in cost such as improving the communication performance and the like, and to reduce the speed of the moving body 1; however, in the data transmitting device 100 of the present embodiment, all the data may be easily transmitted without the need to take such measures.

The data transmitting device 100 may divide all the data to be transmitted into a plurality of data groups and transmit the respective data groups to the receiving units of mutually different vehicles. In this case, even though the data transmitting device has a large amount of data to be transmitted, by distributing the data to the plurality of receiving units 10, all the data may be transmitted as a result. For example, even though the data capacity is large, in a case where one receiving unit 10 must receive all the data, it becomes necessary to improve the performance of the receiving unit 10, to cope with increases in cost such as improving the communication performance and the like, and to reduce the speed of the moving body 1; however, in the data transmitting device 100 of the present embodiment, all the data may be easily transmitted without the need to take such measures.

The data transmitting device 100 may acquire the number of vehicles provided with the receiving units 10 of the moving body 1 and adjust the data transmission mode to each of the receiving units 10 of the plurality of vehicles 2, according to the acquired number of vehicles. In this case, the data transmitting device 100 may transmit data in an appropriate transmission mode according to the number of vehicles.

The data transmitting device 100 may acquire the distance between the receiving units 10 of the moving body 1 and adjust the data transmission mode to each of the receiving units 10 of the plurality of vehicles 2, according to the acquired distance. In this case, the data transmitting device 100 may transmit data in an appropriate transmission mode according to the distance between the receiving units 10 of the moving body 1.

The data transmitting device 100 may acquire the speed of the moving body 1 and adjust the data transmission mode to each of the receiving units 10 of the plurality of vehicles 2, according to the acquired speed. In this case, the data transmitting device 100 may transmit data in an appropriate transmission mode according to the speed of the moving body 1.

The data transmitting device 100 may adjust the data transmission mode to each of the receiving units 10 of the plurality of vehicles 2 according to the total amount of all the data to be transmitted. In this case, the data transmitting device 100 may transmit data in an appropriate transmission mode according to the total amount of all the data.

The data to be transmitted by the data transmitting device 100 may have information on at least one item of: temperature, current, voltage, vibration, and partial discharge of the cable provided on the route 3. Accordingly, the receiving unit 10 of the moving body 1 may inspect the cable while performing the normal operation without slowing down the moving speed and performing a special inspection.

The data transmitting device 100 according to the present embodiment is the data transmitting device 100 that is provided on the route 3 of the moving body 1 and that transmits data to the moving body 1 having the plurality of vehicles 2 in one formation, wherein the data transmitting device 100 is configured to transmit mutually different data to the plurality of receiving units 10 provided in the plurality of vehicles 2 of the moving body 1, respectively.

The communication device 150 according to the present embodiment is the communication device 150 that is provided in the moving body 1 having the plurality of vehicles 2 in one formation and that receives data from the data transmitting device 100 provided on the route 3 of the moving body 1, wherein the communication device 150 includes the plurality of receiving units 10 that are provided in the plurality of vehicles 2 and that are configured to receive mutually different data; and the data synthesizing unit 13 that is configured to synthesize the mutually different data received by each of the receiving units 10

The communication method according to the present embodiment is a communication method for transmitting data by the data transmitting device 100 provided on the route 3 of the moving body 1 to the moving body 1 having the plurality of vehicles 2 in one formation, wherein the communication method includes: a receiving step of receiving information from the moving body 1 in which the receiving unit 10 for receiving data transmitted from the data transmitting device 100 is provided in each of the plurality of vehicles 2; and a transmitting step of transmitting mutually different data to each of the receiving units 10 of the plurality of vehicles 2 based on the information.

With the data transmitting device 100, the communication device 150, and the communication method described above, it is possible to obtain the same operation and effects as those of the communication system described above.

The present invention is not intended to be limited to the embodiments described above.

In the embodiment described above, receiving units 10 are provided only in the three vehicles in the lead. However, the number of receiving units 10 is not particularly limited, and by providing the receiving units 10 in all the vehicles 2, the same number of the receiving units 10 as the number of the vehicles 2 may be provided.

Figure 10:
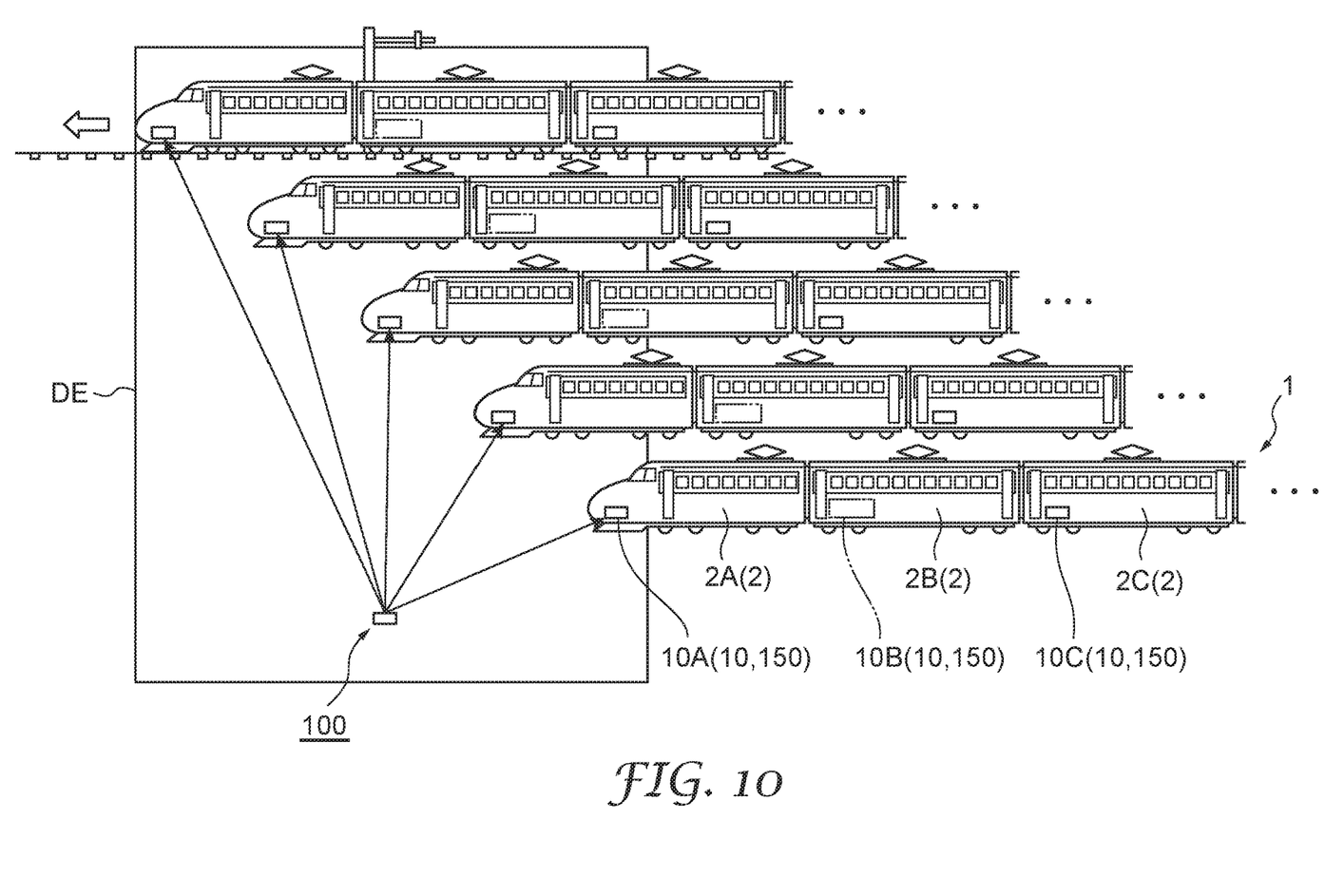
FIG. 10 is a diagram schematically illustrating a positional relationship between a traveling mode of a moving body and a communication area.

Moreover, as illustrated in FIG. 10, in order to efficiently arrange the receiving unit 10 in consideration of the length of the vehicle 2 and the range of the communication area DE, the vehicles 2 in which the receiving unit 10 is not provided may be arranged between the vehicles 2 provided with the receiving unit 10. FIG. 10 is a diagram schematically illustrating a positional relationship between a traveling mode of the moving body 1 and the communication area DE. As illustrated in FIG. 10, the receiving unit 10B enters the communication area DE before the receiving unit 10A leaves the communication area DE. In this case, even though there are two receiving units 10A, 10B in the communication area DE, data may be transmitted to only one receiving unit, so the capacity of the other receiving unit is wasted. Therefore, the receiving unit 10B is preferably omitted.

REFERENCE SIGNS LIST

1 Moving body, 2 Vehicle, 3 Route, 10 Receiving unit, 13 Data synthesizing unit, 100 Data transmitting device, 150 Communication device, 200 Communication system.

What is claimed is:

1. A communication system for transmitting data by a data transmitting device provided on a route of a moving body to the moving body, the moving body having a plurality of vehicles in one formation,
   each of the plurality of vehicles being provided with a receiving unit that receives data transmitted from the data transmitting device, and
   the data transmitting device being configured to:
   determine that each respective vehicle of the plurality of vehicles is positioned within a predetermined communication area;
   based on the determination that each respective vehicle of the plurality of vehicles is positioned within the predetermined communication area, transmit mutually different data to each of the receiving units of the plurality of vehicles;
   receive an "Ack" message from a first vehicle of the plurality;
   based on the received "Ack" message, determine that respective first data was successfully transmitted to the first vehicle of the plurality;
   receive a "No Ack" message from a second vehicle of the plurality;
   based on the received "No Ack" message, determine that respective second data failed to be delivered to the second vehicle of the plurality; and
   based on the determination that the respective second data failed to be delivered to the second vehicle of the plurality, retransmit the respective second data to the second vehicle of the plurality.

2. The communication system according to claim 1, wherein the data transmitting device divides all data to be transmitted into a plurality of data groups and transmits each of the data groups to the receiving units of mutually different vehicles of the plurality.

3. The communication system according to claim 1, wherein the data transmitting device is further configured to:
   acquire a number of the vehicles provided with the receiving units of the moving body; and
   adjust a data transmission mode to each of the receiving units of the plurality of vehicles according to the acquired number of vehicles.

4. The communication system according to claim 1, wherein the data transmitting device is further configured to:
   acquire a distance between the respective receiving units of the moving body; and
   adjust a data transmission mode to each of the receiving units of the plurality of vehicles according to the acquired distance.

5. The communication system according to claim 1, wherein the data transmitting device is further configured to:
   acquire a speed of the moving body; and
   adjust a data transmission mode to each of the receiving units of the plurality of vehicles, according to the acquired speed.

6. The communication system according to claim 1, wherein the data transmitting device is further configured to adjust a data transmission mode to each of the receiving units of the plurality of vehicles, according to a total amount of all data to be transmitted.

7. The communication system according to claim 1, wherein the data transmitted by the data transmitting device includes information indicative of at least one of: temperature, current, voltage, vibration, or partial discharge of a cable provided on the route.

8. The communication system according to claim 1, wherein the "Ack" message is a first "Ack" message, and wherein the data transmitting device is further configured to repeat the retransmission of the respective second data to the second vehicle until receipt of a second "Ack" message from the second vehicle with respect to the retransmitted respective second data.

9. A data transmitting device provided on a route of a moving body having a plurality of vehicles in one formation, the data transmitting device transmitting data to the moving body having a plurality of vehicles in one formation, the data transmitting device being configured to:
- determine that each respective vehicle of the plurality of vehicles is positioned within a predetermined communication area;
  - transmit mutually different data to each respective receiving unit of a plurality of receiving units provided in the plurality of vehicles of the moving body based on the determination that each respective vehicle of the plurality of vehicles is positioned within a predetermined communication area;
  - receive an "Ack" message from a first vehicle of the plurality;
  - based on the received "Ack" message, determine that respective first data was successfully transmitted to the first vehicle of the plurality;
  - receive a "No Ack" message from a second vehicle of the plurality;
  - based on the received "No Ack" message, determine that respective second data failed to be delivered to the second vehicle of the plurality; and
  - based on the determination that the respective second data failed to be delivered to the second vehicle of the plurality, retransmit the respective second data to the second vehicle of the plurality.

10. A communication method for transmitting data by a data transmitting device provided on a route of a moving body to the moving body having a plurality of vehicles in one formation, the communication method comprising:
- receiving information from the moving body in which a receiving unit for receiving the data transmitted from the data transmitting device is provided in each of the plurality of vehicles;
- determining that each respective vehicle of the plurality of vehicles is positioned within a predetermined communication area;
- in response to determining that each respective vehicle of the plurality of vehicles is positioned within the predetermined communication area, transmitting mutually different data to each of the receiving units of the plurality of vehicles based on the received information;
- receiving an "Ack" message from a first vehicle of the plurality;
- based on the received "Ack" message, determining that respective first data was successfully transmitted to the first vehicle of the plurality;
- receiving a "No Ack" message from a second vehicle of the plurality;
- based on the received "No Ack" message, determining that respective second data failed to be delivered to the second vehicle of the plurality; and
- based on the determination that the respective second data failed to be delivered to the second vehicle of the plurality, retransmitting the respective second data to the second vehicle of the plurality.

11. The communication method according to claim 10, wherein the "Ack" message is a first "Ack" message, the communication method further comprising repeating the retransmission of the respective second data to the second vehicle until receiving a second "Ack" message from the second vehicle with respect to the retransmitted respective second data.

* * * * *